United States Patent [19]
Hämäläinen et al.

[11] Patent Number: 6,052,369
[45] Date of Patent: Apr. 18, 2000

[54] NETWORK ELEMENT IN A MOBILE COMMUNICATION SYSTEM AND A METHOD FOR PACKET DATA TRANSMISSION IN A MOBILE COMMUNICATION SYSTEM

[75] Inventors: Jari Hämäläinen, Tampere; Jussi Rajala, Espoo; Matti Keskinen, Järvenpää, all of Finland

[73] Assignees: Nokia Telecommunications OY, Espoo; Nokia Mobile Phones Ltd., Salo, both of Finland

[21] Appl. No.: 08/676,324
[22] PCT Filed: Jan. 20, 1995
[86] PCT No.: PCT/FI95/00024
  § 371 Date: Jul. 16, 1996
  § 102(e) Date: Jul. 16, 1996
[87] PCT Pub. No.: WO95/20283
  PCT Pub. Date: Jul. 27, 1995

[30] Foreign Application Priority Data

Jan. 21, 1994 [FI] Finland ..................... 940314

[51] Int. Cl.[7] ..................... H04J 3/24
[52] U.S. Cl. ..................... 370/389; 370/522
[58] Field of Search ..................... 370/389, 395, 370/465, 466, 467, 470, 471, 472, 473, 524, 523, 509, 342, 335, 320, 311, 401, 522, 527, 528, 529, 441, 442, 347, 351, 352, 468, 901, 904, 908, 912, 913; 374/219, 220, 225, 230, 231, 236, 237, 229, 226; 455/442, 524, 517, 525, 560, 561

[56] References Cited

U.S. PATENT DOCUMENTS 4,697,281  9/1987  O'Sullivan ..................... 379/59
5,157,660  10/1992  Kuwahara et al. ..................... 370/360
5,168,498  12/1992  Adams et al. ..................... 370/95.1
5,278,892  1/1994  Bolliger et al. ..................... 370/339
5,343,494  8/1994  Averst et al. ..................... 370/313
5,517,497  5/1996  Le Boudec et al. ..................... 370/395

FOREIGN PATENT DOCUMENTS 522 773  1/1993  European Pat. Off. .
571 104  11/1993  European Pat. Off. .

OTHER PUBLICATIONS

Hämäläinen et al: "Packet data over GSM network", TDOC SMGL 238/93, Sep. 28, 1993, p. 1–8. see p. 4, line 1–23.

*Primary Examiner*—Dang Ton
*Attorney, Agent, or Firm*—Pillsbury Madison & Sutro Intellectual Property

[57] ABSTRACT

For packet data transmission between fixed network elements, such as a mobile exchange, a base station controller and base stations, in a mobile communication system, a node-to-node packet data transmission in a digital mobile communication network is carried out by using network elements as packet nodes and by utilizing existing signalling protocols between them for transmitting data packets. Only a processing of incoming and outgoing data packets is introduced into the network elements. The normal signalling messages of a mobile communication network used for packet data transmission are only provided with a new identifier indicating that the message contains packet data, so that the packet data messages can be forwarded to the packet data processing, instead of normal signalling message handling.

15 Claims, 4 Drawing Sheets

NETWORK ELEMENT IN A MOBILE COMMUNICATION SYSTEM AND A METHOD FOR PACKET DATA TRANSMISSION IN A MOBILE COMMUNICATION SYSTEM

This application claims benefit of international application PCT/Fl95/00024, filed Jan. 20, 1995.

FIELD OF THE INVENTION

The invention relates to a method for packet data transmission between fixed network elements, such as a mobile exchange, a base station controller and base stations, in a mobile communication system. The invention also relates to fixed network elements of a mobile communication system applying such a method.

BACKGROUND OF THE INVENTION

The introduction of digital mobile communication systems, such as the panEuropean mobile telephone system GSM, signifies a breakthrough, when the intention is to support mobile data transmission in public cellular networks. Since the GSM is entirely digital and utilizes general principles of an ISDN (Integrated Services Data Network), the GSM is inherently capable of transmitting data. For the user, the GSM does not represent a dedicated data transmission network, but an Access Network. In other words, data transmission via GSM is intended to allow an access into dedicated data networks. The current GSM recommendations specify only circuit switched data services in a cellular network. This means that a circuit switched connection is reserved for a data transmission in a mobile communication network and radio resources are kept allocated during the entire data session, even during silent periods when no communication whatsoever occurs. Because one characteristic feature of data communication is that data is sent in bursts, a circuit switched transfer is expensive for the user and wastes channel capacity in the network infrastructure. There is thus a need for connectionless (not circuit switched) packet data services in the GSM network infrastructure.

The architecture of a conventional packet data network can be considered as a single virtual network consisting of a plurality of small interconnected networks. Each terminal equipment, e.g. a computer, is connected to one of these local networks, i.e. packet nodes, capable of transmitting data packets via other nodes to a recipient. Each data packet is routed separately, i.e. the node computer searches for the address of the recipient in a packet header and forwards the data packet to the next node by using an internal routing algorithm.

There are various dedicated packet switched radio networks. It is, however, difficult to apply solutions used in such networks to already standardized (an even setup) GSM networks, without making significant modifications in the standard operation and configuration of the network and without significant economic investments. No effective solutions to provide a connectionless packet switched data transfer in a fixed network of the GSM system or a corresponding mobile communication system have been presented.

SUMMARY OF THE INVENTION

An object of the present invention is a method for implementing a connectionless node-to-node packet data transmission between network elements in a fixed network of the GSM system, or in a corresponding digital mobile communication system, without significant deviations from the standard configuration and operation of the network, and with as low economic investments as possible.

This is achieved by means of a method for packet data transmission between network elements, such as a mobile exchange, a base station controller and base stations, in a fixed network of a mobile communication system, which method is according to the invention characterized by:

producing a transmission frame in accordance with a signalling protocol between the network elements and provided with an identifier for the packet data transmission, inserting the packet data to be transmitted into the transmission frame, transmitting the transmission frame containing packet data from a transmitting network element to a receiving network element by utilizing a connectionless signalling system between the network elements and the signalling protocol.

A second aspect of the invention is a fixed network element, such as a mobile exchange, a base station controller or a base station, in a mobile communication system, comprising signalling means for connectionless signalling in accordance with a predetermined signalling protocol with other network elements of the mobile communication network. According to the invention, the network element is characterized in that it further comprises:

means for producing a transmission frame in accordance with the signalling protocol, which frame is provided with an identifier for the packet data transmission, means for inserting the user packet data to be transmitted into the frame, and that the signalling means transfer the transmission frame containing the packet data to another network element by using the connectionless signalling system between the network elements and said signalling protocol.

The present invention is based on a utilization of signalling protocols and systems existing in mobile communication networks for packet switched data transmission between fixed network elements in mobile communication systems. In a GSM network, for instance, signalling is carried out by using CCITT Signalling System 7 protocols at the A interface. These protocols (hereafter called SS7) operate exactly on a node-to-node principle, i.e. provide a transmission of messages from node to node. Additionally, a similar connectionless LAPD (Link Access Protocol for the D Channel) is used at the Abis interface comprising no SS7 signalling links. Consequently, it is possible according to the invention to build a node-to-node packet data transmission in a digital mobile communication network by using network elements as packet nodes and by using signalling protocols and systems between them, such as SS7 and LAPD, for the transmission of data packets. Only means for processing incoming and outgoing data packets are introduced into the network elements. Normal signalling messages of the mobile communication network are used for packet data transmission, which messages are only provided with a new identifier indicating that the message contains packet data, so that packet data messages can be forwarded to the packet data processing means, instead of to normal processing of signalling messages.

By means of the invention, a connectionless (not circuit switched) packet data transmission is provided in a fixed network of a mobile communication system, without the necessity of changing the normal operation and configuration of the network hardly at all and thus without high investment costs. A connectionless packet data transmission enables an improved utilization of the channel capacity of the network and, on the other hand, provides a transmission method which is more advantageous for the user. Thanks to the invention, charging for a data transmission may be based on the number of data packets transmitted. For this reason, invoicing is easy to arrange. One of the nodes along the data path examines the source address and the packet length and transmits the information to an invoicing center.

BRIEF DESCRIPTION OF THE DRAWINGS

The invention will be explained in the following by means of preferred embodiments with reference to the attached drawings, in which.

DETAILED DESCRIPTION OF EMBODIMENTS OF THE INVENTION

The present invention is suitable for being used in all mobile communication systems using a connectionless CCITT Signalling System 7 (SS7) signalling protocol or the like. The invention is particularly preferable for being used in the panEuropean digital mobile communication system GSM and in corresponding digital systems, such as DCS1800 and PCN. The preferred embodiments of the invention will be described below implemented in the GSM system, but not restricted to that, however.

As regards the detailed configuration and operation of the GSM system, reference is made to the ETSI recommendations concerning GSM as well as to the book "The GSM System for Mobile Communications", M. Mouly & M. Pautet, Palaiseau, France, ISBN:2-9507190-0-7.

Figure 1:
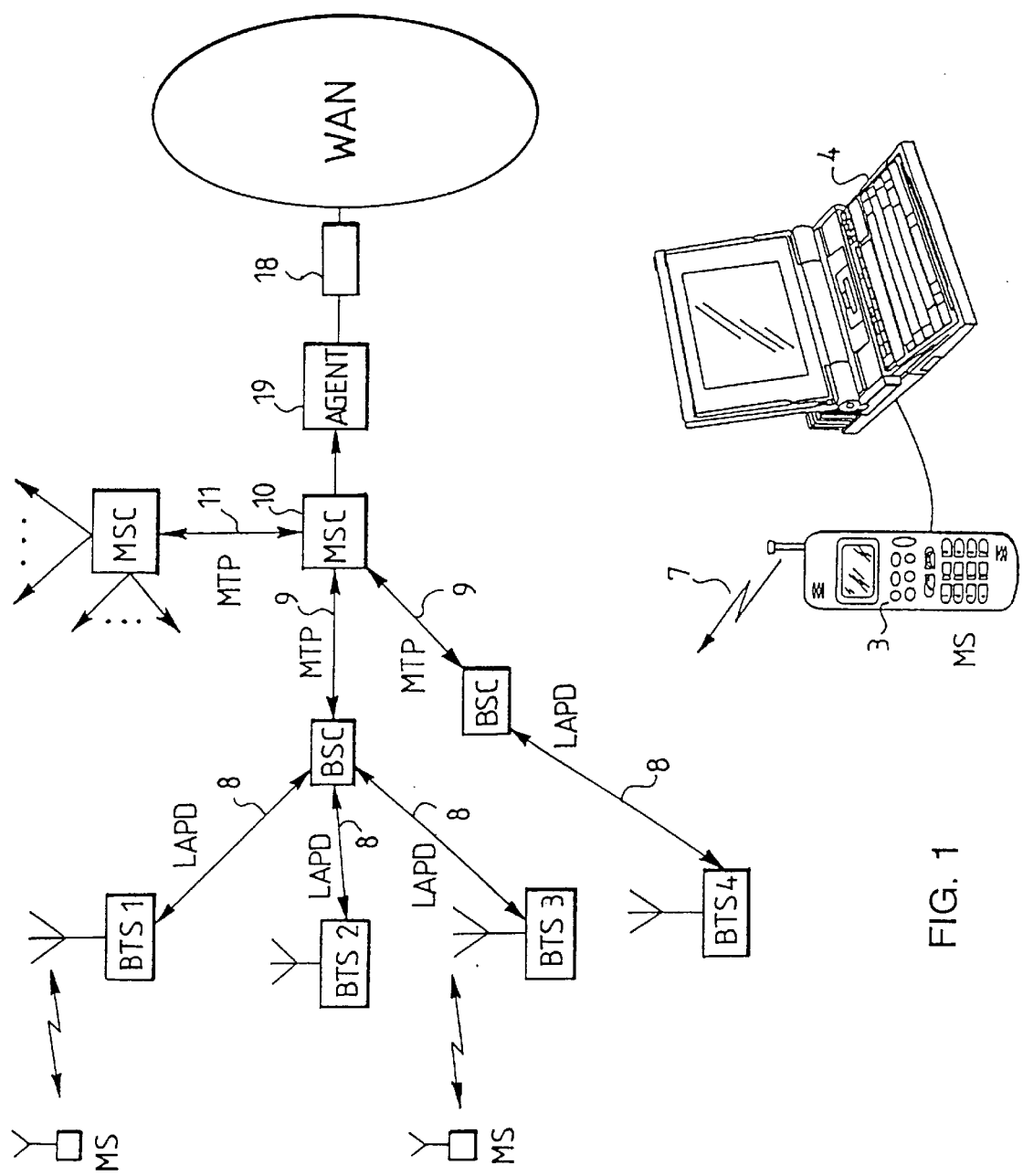
FIG. 1 illustrates a mobile communication network according to the invention and the interface to data networks.

FIG. 1 shows schematically part of a GSM cellular radio system. The area covered by a cellular radio system is subdivided into radio cells. Base station systems BSS (only 2 of them being shown in the figure) are connected by digital transmission links 9 to a mobile exchange MSC 10. Each base station system BSS comprises a base station controller BSC, to which is further connected one base station or several base stations BTS by digital transmission links 8. The radio coverage area of one base station BTS typically constitutes one radio cell. A predetermined number of RF carrier frequencies is allocated to each base station BTS1 to BTS4. A signal of the GSM system consists of TDMA frames, each of them preferably containing 8 time slots, by which logical channels are transferred. The logical channels contain traffic channels for establishing calls (speech and data) with mobile radio stations MS3 within the cell, and control channels for signalling with the mobile radio stations MS3 (mobile stations) within the cell. A speech connection, a V.110 rate-adapted 64 kbit/s Full Duplex data connection or a 9.6/4.8/2.4 kbit/s data connection can be established on the traffic channels. A traffic channel can also be configured to a 12 kbit/s data channel, if transmission protocol RLP (Radio Link Protocol) is not used.

In the GSM network, data transmission is at present arranged on a circuit switched channel dedicated for each mobile station MS3 as per need. In other words, a traffic channel in a radio path 7 and a transmission channel in the digital transmission links 8 and 9 are allocated for each circuit switched data transmission channel for the entire data session. A special-purpose connection adapter for adapting a data connection to terminal equipments and/or other transmission connections/transmission systems is typically needed at both ends of the data connection. A connection adapter associated with a mobile station MS3 is generally called a terminal adapter, and a connection adapter at the network end is called an interworking function IWF. In general, such an interworking function is located in the mobile exchange MSC of the GSM mobile communication network.

In the GSM recommendations, three different interfaces can be distinguished, i.e. an radio interface over the radio path 7, an Abis interface between a base station BTS and a base station controller BSC, and an A interface between a base station controller BSC and a mobile exchange MSC. The A interface is also applied to digital connections 11 between two mobile exchanges MSC. Signalling at the A interface of the GSM network is carried out by the CCITT Signalling System 7 protocol. This protocol proceeds on a node-to-node principle, i.e. provides a data transmission in node-to-node messages. The LAPD (Link Access Protocol for the D Channel) is used at the Abis interface.

In accordance with the invention, it is possible to construct in the fixed part of a mobile communication network a node-to-node packet transmission in the same way as in packet data networks, by implementing the network elements, such as the base stations BTS, the base station controllers BSC and the mobile exchanges MSC, as packet nodes, and by using signalling links between them, such as SS7 and LAPD links, for the transmission of the data packets.

By means of the invention, a mobile station MS3, consisting according to FIG. 1, for instance, of a mobile radio station 3 and a remote work station 4 (e.g. a personal computer PC) connected thereto, may send a data packet to a base station BTS4 by a new access method, which is suitable for packet data transmission and uses a radio channel only during the time needed for the transmission of the data packet. The invention is independent of which access method is used at the radio interface 7 between the mobile station MS3 and the base station BTS, since the invention relates primarily to implementing a packet transmission between fixed network elements. The base station BTS4 transmits the data packet received from the mobile station MS3 to a base station controller BSC, which forwards the data packet to a mobile exchange MSC. The data packet is routed in every node based on a destination address in a packet header, and each packet is routed independently.

In the preferred embodiment of the invention shown in FIG. 1, a computer 19, referred to as AGENT19 below, is additionally associated with the mobile exchange MSC for processing data packets. The AGENT19 is a data service center, to which all data packets from the mobile stations MS3 located within its service area are routed. The AGENT19 also attends to location updating of the mobile stations MS3 using data services, as will be explained in more detail below. Addressing and routing of the data packets between the base station controller BSC, the mobile exchange MSC and the AGENT19 are carried out by standard SS7 procedures on the MTP3 (Message Transfer Part) level. In the preferred embodiment of the invention, routing from the base station controller BSC to the mobile station MS3 is based on the identity of the mobile station MS, as will be explained below. As already noted above, the routing of the data packets from the mobile station MS is rather straight-forward, since the data packets are always routed to the service center AGENT19 serving the area.

The data service center AGENT19 is in the preferred embodiment of the invention shown in FIG. 1 connected by a conventional router 18 to external data networks, such as a WAN (Wide Area Network). The service center AGENT19 thus constitutes an interface between the MSC10 and the external data networks WAN. The interface between the mobile exchange MSC10 and the service center AGENT19 connected thereto as well as the used protocol are not essential for the invention and will usually be dependent on the manufacturer of the mobile exchange MSC. In the preferred embodiment of the invention, however, a direct data link between the MSC10 and the data service center AGENT19, allocated for this purpose, and a manufacturer-specific protocol are used. One alternative solution is that the data service center 19 is a switching node similar to, for instance, the mobile exchange MSC or the base station controller BSC, in the SS7 signalling network.

It is also possible to connect any of the nodes, i.e. network elements, of the mobile communication network to an external network, such as WAN. This is effected by connecting a data service center (similar to AGENT19, for instance) to the node via which the gateway to the external network is provided. The AGENT19 could thus be connected alternatively to the base station controller BSC or even to the base station BTS.

It is assumed in the preferred embodiment of the invention that a data service center AGENT is connected to each mobile exchange MSC. However, if the network operator wishes to use only one data service center AGENT in the whole network, which is connected to one of the mobile exchanges, a particular centralizing routing function must be used between the mobile exchanges. The protocol used at the interface between two mobile exchanges MSC is the MTP, i.e. the same protocol as is used at the interface between the mobile exchange MSC and the base station controller BSC. The routing of data packets from one mobile exchange MSC towards a centralized data service center AGENT connected to another mobile exchange MSC is thus performed on the same principle as the routing from the base station controller BSC to the mobile exchange MSC. The addressing used for routing is based on destination point code, each mobile exchange MSC and data service center AGENT having a unique point code in the mobile communication network for identifying the network element in question. The mobile exchange MSC (relay MSC) transmitting the data packet comprises a packet processing unit attending to the procedures needed for forwarding the data packets.

In the following, the protocols used in the preferred embodiment shown in FIG. 1 at different interfaces, i.e. radio interface 7 (MS-BTS interface), BTS-BSC interface 8 and BSC-MSC interface 9, will be examined in more detail.

Radio interface

As mentioned above, the present invention is independent of the access method used for packet transmission at the radio interface 7. To clarify the concept, however, an example of such a media access control is given. It is assumed in all protocols that the media access control is carried out between a mobile station MS and a base station BTS, whereby no involvement of the other network elements, i.e. nodes, is needed.

It is possible to allocate several traffic channels or even a carrier solely for packet data transmission. In this case, uplink and downlink channels could be used. Packet data transmitted by a mobile station on an uplink channel could optionally be forwarded immediately to a downlink channel. This could secure the mobile station MS of the correctness of the data packet transmitted. The access method could be any Aloha-based media access control method. All mobile stations try to get an access to a traffic channel. This mechanism might require some modifications of the lower layers of the GSM system, but it may also be provided by means of a standard traffic channel structure, due to which only a new media access control needs be implemented.

BTS-BSC interface procedures

The signalling link protocol over the Abis interface is the LAPD, which is an HDLC (High Level Data Link Control) type link protocol. In addition to the properties from the HDLC protocol, the LAPD includes a management of many simultaneous connections. The LAPD provides a reliable transfer over a direct link between two nodes.

Figure 2:
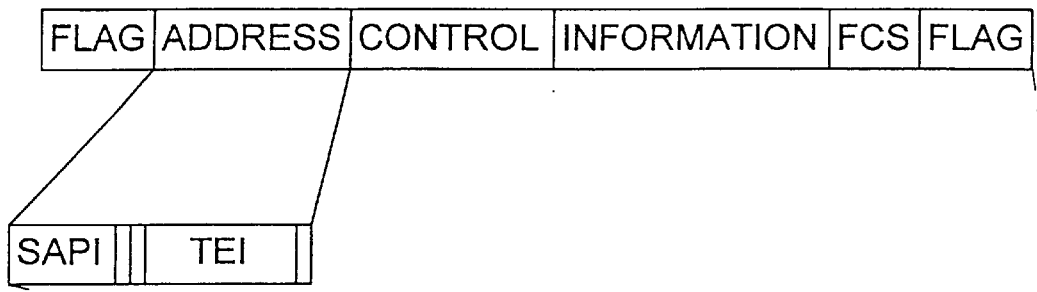
FIG. 2 shows an LAPD frame used at the Abis interface.

FIG. 2 shows the format of an LAPD frame. The length of the LAPD frames of the Abis interface is limited to 264 octets, comprising 260 octets for upper layer information. Flow control numbering is based on modulo 128 and the information flow is continuous. Thus no data rate limitation is detected. Services are divided into connection-oriented and connectionless services. Connectionless service is used mainly for transmitting management information. For the invention, connectionless protocol is the most interesting one, since it fits perfectly with connectionless packet data transmission. This requires only a small additional definition for the LAPD frame. Currently, transceivers TRX and other units of the base station BTS may have either one common physical connection to the base station controller BSC or each transceiver may have a physical connection of its own. The addressing of signalling packets to a transceiver TRX and other units of a base station is made by using a Terminal Endpoint Identifier (TEI) field of the LAPD frame. Then, each transceiver and other unit has its own TEI. Different logical links may be defined for a TEI value by means of a Service Access Point Identifier (SAPI) field of the LAPD frame. At present, three logical links are defined for each TEI value:

Radio Signalling Link (RSL) for supporting traffic management procedures, SAPI=0

Short Message Service, SAPI=3

Operations and Maintenance Link (OML) for supporting network management procedures, SAPI=62

Layer 2 Management Link (L2ML) for layer 2 management messages, SAPI=63.

For a packet data transmission according to the invention, a new logical link and a new corresponding SAPI value are reserved:

Packet Data Link (PDL) for packet data transmission procedures, SAPI=x (e.g. SAPI=5).

Furthermore, it is possible that there exists a separate physical packet data connection (or even several connections) for each base station transceiver TRX having packet channels at the radio interface 7. Another possibility is that there exists a common physical connection to the radio signalling link RSL and the packet data link PDL, if the amount of packet data traffic is low. The use of different SAPI values makes it possible to give different priorities to the radio signalling link RSL and the packet data link PDL when a common physical connection is used.

Figure 3:
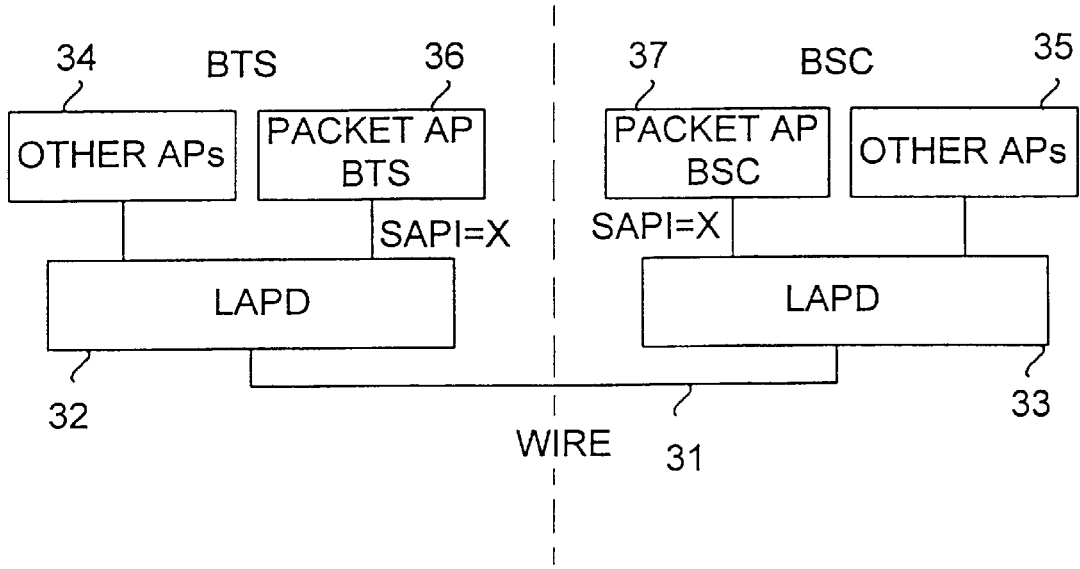
FIG. 3 shows multiplexing of several Application Part protocols into an LAPD link at the Abis interface.
Figure 5A:
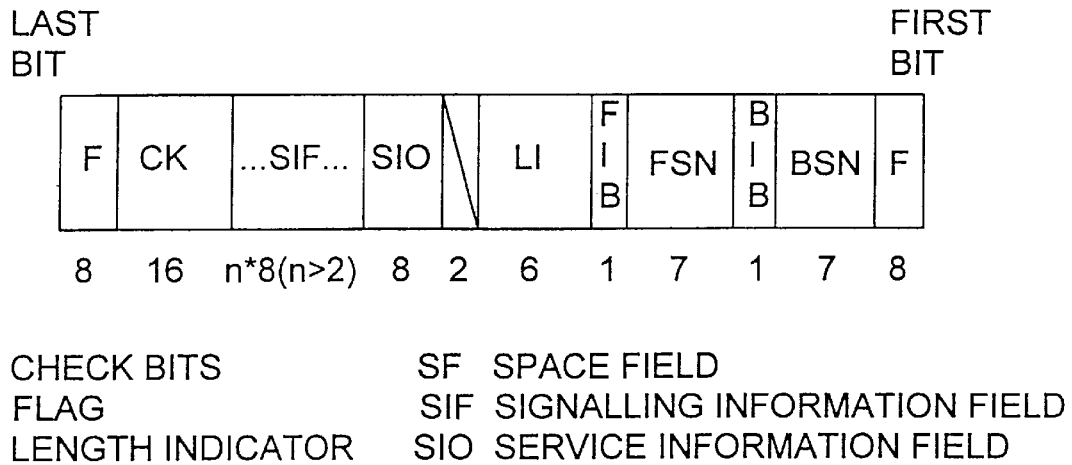
FIGS. 5A and 5B show the basic format of an MTP message signal unit.

FIG. 3 shows multiplexing of different Application Part (AP) protocols into an LAPD link of the Abis interface. FIG. 3 shows a base station BTS and a base station controller BSC, which are interconnected by a physical connection 31. The base station BTS is provided with means 32 and the base station controller BSC with means 33, respectively, for establishing an LAPD protocol LAPD link between the base station BTS and the base station controller BSC over the physical connection 31. For the invention, the base station BTS and the base station controller BSC comprise packet processing means 36 and 37, respectively, i.e. a packet application part (packet AP), taking the packet processing measures required by a packet transmission according to the invention. Other application parts AP, such as signalling, using LAPD protocol transmission, are generally indicated by blocks 34 and 35. These blocks are of no significance for the invention and they are not discussed in further detail herein. In the transmission direction, the packet processing means 36 or 37 insert the data packet to be sent in an information field of an LAPD frame, as shown in FIG. 5A, and insert in a SAPI field an identifier indicating the packet data transmission. The constructed LAPD protocol frame is applied to the LAPD means 32 or 33 of a transmitting network element, i.e. a node, in order to further forward the LAPD frame in accordance with the LAPD protocol to the LAPD means 32 or 33 of a receiving network element, i.e. a node. In the uplink direction the BSC forwards the packet to the MSC/service center AGENT19.

Figure 4:
FIG. 4 shows a Layer 3 frame at the Abis interface.

In the downlink direction, the packet processing means 37 of the BSC select the traffic channel on which the packet is transmitted from the base station BTS to the mobile station MS. It is assumed in a preferred embodiment of the invention that the mobile stations MS are divided into groups, each of them using always the same physical packet data channel in a cell. To reduce the power consumption of the mobile station MS, this channel may be further divided into blocks, each MS monitoring one of the blocks to monitor the data packets sent by the base station BTS. The channel and the block within the channel are determined by a Mobile Station Identity IMSI. The base station controller BSC sends the channel number and the group number to the base station BTS in a Layer 3 message of the Abis interface, which message is depicted in FIG. 4. This frame contains in the data part a higher level data packet, the transmission of which is going on between the mobile station MS and the MSC/AGENT19. This data packet may be e.g., of the type shown in FIGS. 8 and 9, in which case is also contains the header part thereof. The header field of the Abis interface frame in FIG. 4 depends on the Media Access Control method used on the radio interface. If the channel is not divided into subgroups, there is no need for the group number field in the header field. Message type field may also be omitted, if only one kind of messages are transmitted.

BSC-MSC interface procedures

The SS7 protocols used for common channel signalling at the A interface are Message Transfer Part (MTP) and Signalling Connection Control Part (SCCP). These protocols can be used for connectionless packet data transmission on node-to-node principle. In the preferred embodiment of the invention, the packet data transmission is implemented on the MTP level.

The MTP is a lower protocol taking care of a physical data link, a signalling data link and signalling network functions (signalling message handling and signalling network management). The MTP is defined in CCITT red book recommendations Q.702 to Q.704 and Q.707. The transmission is carried out at the data rate of 64 kbit/s over a physical link (MTP1). Signalling link functions (MTP2) take care of the functions and procedures relating to the transfer of messages over an individual link; including delimitation of signal units, error correction and sequence control. Thus, the data transmitted over the link should be free of errors. The MTP 3 provides the signalling network management functions and the signalling message handling functions. The actual transfer of messages is carried out by the MTP level 3. The level 3 of the MTP has three main functions: discrimination of messages belonging to a local user part, routing of messages and distribution of messages to the appropriate user parts. A Message Signal Unit (MSU) has a variable length, 272 octets at the A interface at the maximum, including 8 octets for the header. The services produced by the MTP for higher levels are MTP-TRANSFER, MTP-PAUSE and MTP-RESUME.

Figure 5B:
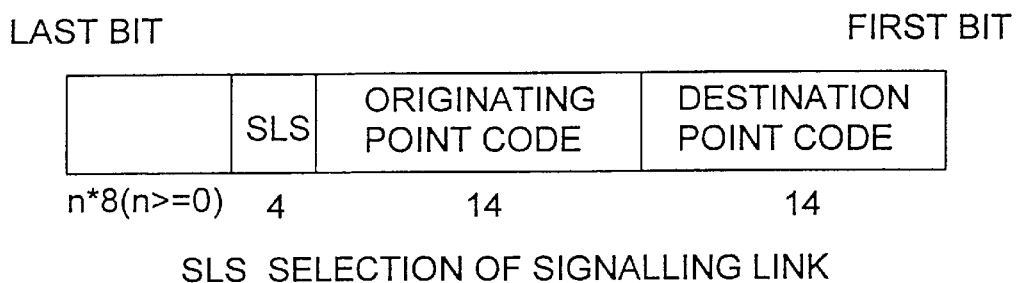

The structure of an MTP signal unit is depicted in FIGS. 5A and 5B. The most important fields are a length indicator (length of a signalling information field in a signalling unit), a service information octet (used for indicating a particular user part) and a signalling information field (carrying actual higher level signalling information). The signalling information field consists of a routing label and higher level data. The routing label is used for routing message signal units. The routing is based on a destination point code, which is unique throughout the whole national telecommunication area. The MTP based message transfer is a connectionless service of datagram type, i.e. each message signal unit is routed independently of each other.

The node-to-node packet transmission system according to the invention is built on top of an MTP protocol stack. This enables the equal packet size to be used at the Abis and A interfaces. Additionally, the amount of header information is minimized, since no SCCP is used. However, the implementation is not restricted to the MTP, but it is also possible to build a packet transmission system according to the invention on top of the SCCP, as will be explained later. Functions on the MTP level 3 are used for packet transfer according to the invention between a mobile exchange MSC and a base station controller BSC. A new value is determined in a Service Information Octet (SIO) field of the MTP message signal unit according to FIG. 5A as an identifier for the packet data transmission, by means of which identifier the packet data frames can be distinguished from the other MTP frames.

Figure 6:
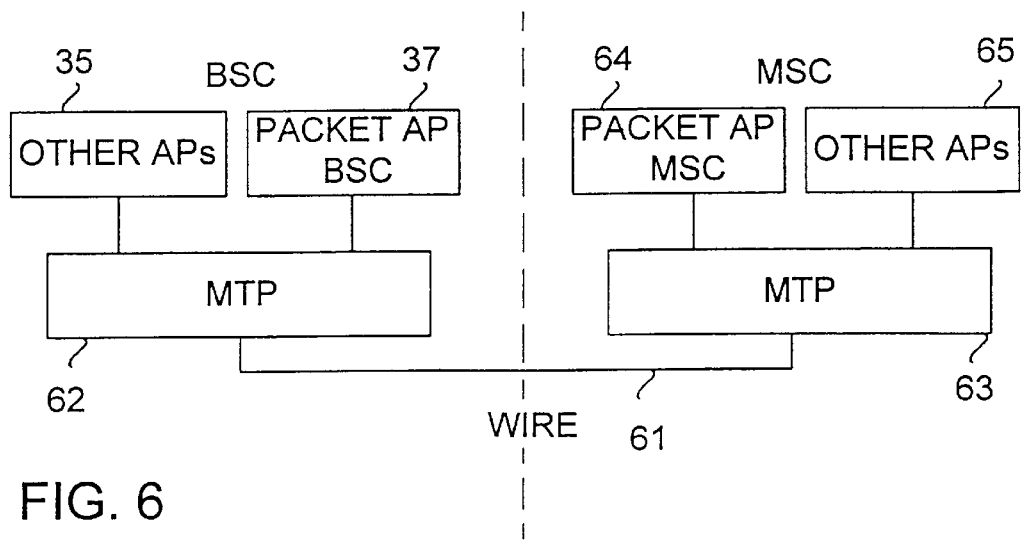
FIG. 6 shows multiplexing of several Application Part protocols into an MTP link at the A interface.

FIG. 6 shows a base station controller BSC and a mobile exchange MSC, which are interconnected by a physical connection 61. The base station controller BSC and the mobile exchange MSC comprise means 62 and 63, respectively, for carrying out an MTP protocol message transfer over the physical connection 61. For the invention, the base station controller BSC and the mobile exchange MSC comprise packet processing means 37 and 64, respectively, i.e. a packet application part (packet AP), carrying out the packet processing required by the packet transmission according to the invention. Other application parts AP, such as signalling, using MTP procotol transmission, are generally indicated by blocks 35 and 65. These blocks are of no significance for the invention and are not discussed in further detail in this connection. In the transmission direction, the packet processing means 37 or 64 insert the data packet to be transmitted in a Signalling Information Field (SIF) of an MTP frame according to FIG. 5A, and insert in the SIO field an identifier for the packet data transfer. The constructed MTP protocol frame is applied to the MTP means 62 or 63 of a transmitting network element, i.e. a node, which forwards the frame, in accordance with the MTP protocol, to the MTP means 62 or 63 of a receiving network element, i.e. a node. The MTP means 62 or 63 of the receiving node analyze the SIO field of the received MTP frame and forward the packets, in which the SIO contains the packet data transfer identifier, to the packet data processing means 37 or 64 of the network element. The packet data processing means 37 or 64 examine the SIF field of the frame and extract the data packet for further processing. In the uplink direction, the MSC transmits the packet to the data service centre AGENT19 or another mobile exchange MSC. In the downlink direction, the BSC transmits the data to the base station in the manner described above.

Packet data transmission according to the invention at the A interface can be carried out by using the Signalling and Connection Control Part (SCCP) protocol instead of the MTP protocol. The SCCP uses services produced by the MTP. The SCCP is defined in CCITT red book recommendations Q.711 to Q.714. The SCCP produces for the MTP additional functions covering connectionless and connection-oriented network services. The most interesting alternative is to use connectionless service for packet transmission. There exist two classes of connectionless services: class 0 and class 1. Class 0 does not include sequence control information, but class 1 does. The sequence control information enables a reception of a plurality of packets in transmission order. However, only class 0 is in use in the GSM system. The length of one connectionless NSDU is 32 octets. This alternative enables a use of a signalling link only when required, and a multiplexing of several connections into the same link could be arranged easily. It is possible to carry out the packet data transmission described above in connection with the MTP protocol by using a SCCP layer on top of the MTP. The packet format is, however, smaller and requires an implementation of fragmentation functions.

Figure 7:
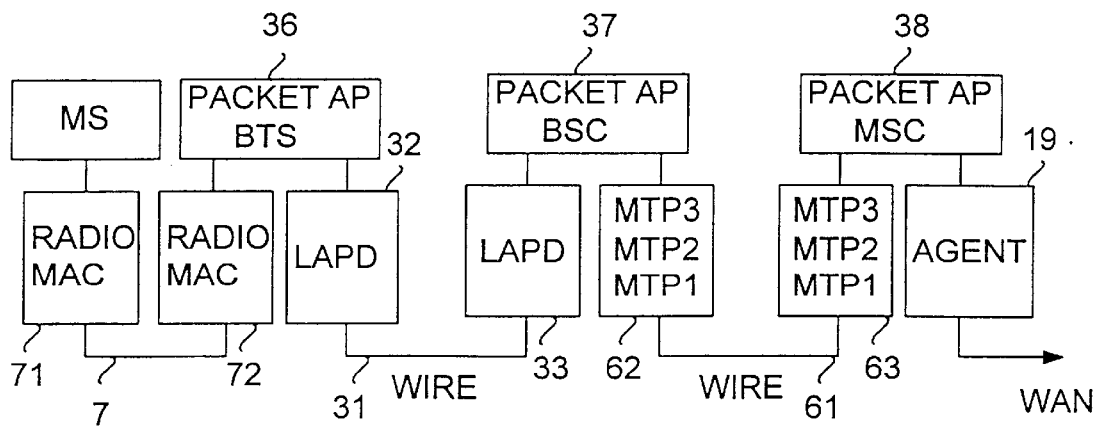
FIG. 7 shows a protocol stack of a node-to-node connection.

A node-to-node connection in a packet data transmission according to the invention can be described on system level by means of a protocol stack according to FIG. 7. Between a mobile station MS and a packet handler 36 of a base station BTS, there are means 71 and 72 performing a media access control of the radio path 7. Between the packet handler 36 of the base station BTS and the packet handler 37 of the base station controller, there is an LAPD protocol connection, as described in connection with FIG. 3. Correspondingly, between the packet handler 37 of the base station controller BSC and the packet handler 64 of a mobile exchange MSC, there are means 62 and 63 implementing the MTP protocol, as explained in connection with FIG. 6. On the other hand, the packet handler 64 of the mobile exchange MSC communicates with a packet service center AGENT19, which again forwards the packets to an external data network WAN. One function of the packet handler of the base station BTS is to adapt the packet data to be transmitted in an LAPD protocol transmission frame to the media access control method MAC used between the base station and the mobile station, and to the packet data transmission protocol. Correspondingly, one task of the packet data handler of the base station controller BSC is to adapt the packet data to be transferred in LAPD protocol transmission frames between the base station and the base station controller to MTP signalling protocol transmission frames used between the base station and the mobile exchange and vice versa.

Figure 8:
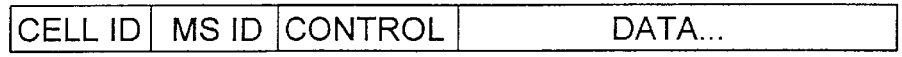
FIG. 8 shows a data packet format used between a base station controller and a packet processing computer.

The packet format used between the base station controller BSC and the data service center AGENT19 connected to the mobile exchange MSC is shown in FIG. 8. The packet contains a Cell Identifier ID, a Mobile Station Identifier MS ID, control data Control and a user data block Data.

At the Abis and radio interfaces, the packet format is reduced from the format shown in FIG. 7. The base station controller BSC uses the cell identification field Cell ID for transmitting the packet to the correct base station BTS. The Cell ID field is eliminated in the base station controller BSC in order to reduce the amount of extra header information to be transmitted over the radio path.

Figure 9:
FIG. 9 shows a data packet format used between a base station and a base station controller.

In this way, the packet format will be as shown in FIG. 9. In a packet transmission starting from a mobile station MS, the mobile station MS transmits the packet shown in FIG. 9 over the radio path and a base station BTS transmits it to a base station controller BSC. In the base station controller BSC, a packet processing means 37 adds the Cell ID field to the packet.

The figures and the description relating to them are only intended to illustrate the present invention. As regards the details, the invention may vary within the scope and spirit of the attached claims.

We claim:

1. A method for packet data transmission between fixed network elements in a mobile communication system, comprising:

producing a transmission frame in accordance with a signalling protocol existing between said fixed network elements and provided with a packet data transmission identifier for the packet data transmission;

inserting the packet data to be transmitted into the transmission frame; and transmitting the transmission frame provided with the identifier and containing the packet data from a transmitting one of said fixed network elements, to a receiving one of said fixed network elements, by utilizing a connectionless signalling system between the respective said fixed network elements and utilizing said signalling protocol while simultaneously using said signalling protocol and said connectionless signalling system for controlling circuit switched connections between said fixed network elements.

2. The method according to claim 1, receiving the transmission frame by said receiving one of said fixed network elements in accordance with said signalling protocol;

analyzing by said receiving one of said fixed network elements whether said transmission frame is a signalling frame or is a transmission frame used for packet data transmission and containing a packet data transmission identifier; and upon finding said transmission frame to be a transmission frame containing said packet data transmission identifier, forwarding said transmission frame by said receiving one of said fixed network elements to data packet processing.

3. The method according to claim 1, wherein:

said transmitting is between a base station and a base station controller;

said producing includes producing an LAPD transmission frame, in which a Service Access Point Identifier field is provided with said packet data transmission identifier;

said inserting includes inserting said packet data to be transmitted into said LAPD transmission frame; and said transmitting includes transmitting said LAPD transmission frame containing said packet data to the respective said network element, as indicated by a destination address, by using a connectionless LAPD signalling system between the respective said network elements and the LAPD signalling protocol.

4. The method according to claim 1, wherein:

said transmitting is between a base station controller and a mobile exchange, as well as between mobile exchanges;

said producing includes producing an MTP protocol transmission frame, in which a Service Identification Octet field is provided with said packet data transmission identifier;

said inserting includes inserting said packet data to be transmitted into said MTP transmission frame; and said transmitting includes transmitting said MTP transmission frame containing packet data to the respective said network element, as indicated by a destination address, by using a connectionless MTP signalling system between respective said network elements and the MTP signalling protocol.

5. The method according to claim 1, wherein:

said signalling protocol is an SCCP protocol; and said transmitting is between a base station controller and a mobile exchange, and further between mobile exchanges.

6. A fixed network element in a mobile communication system, comprising:

signalling means for connectionless signalling in accordance with a predetermined signalling protocol with other network elements of a mobile communication network, said signalling means being primarily used for control signalling relating to circuit switched connections between said network elements;

means for producing a transmission frame in accordance with said signalling protocol, such that said frame is provided with a packet data transmission identifier for the packet data transmission;

means for inserting user packet data to be transmitted, into said frame; and said signalling means being arranged to transfer said transmission frame provided with said identifier and containing said packet data, to another network element, by using connectionless signalling between the respective said network elements and using said signalling protocol.

7. The fixed network element according to claim 6, additionally comprising:

means for analyzing transmission frames received by said fixed network element from another network element; and means for extracting packet data from transmission frames containing said packet data transmission identifier.

8. The fixed network element according to claim 6, further comprising:

means for analyzing the transmission frames received by said fixed network element from another network element; and means for transmitting said received transmission frames containing the packet data transmission identifier further by said fixed network element to a next network element.

9. The fixed network element according to claim 6, wherein:

said fixed network element is a base station; and said base station comprises means for further adapting said user packet data adjusted to be transmitted in said transmission frame in accordance with said signalling protocol, to a packet data transmission protocol used between said base station and a mobile station.

10. The network element according to claim 6, wherein:

said network is a base station controller; and said base station controller comprises means for inserting said user packet data from said transmission frame provided with said identifier in accordance with said signalling protocol, into a transmission in accordance with a second signalling protocol, which is in use between said base station controller and a mobile exchange.

11. The network element according to claim 6, wherein:

said network element is a mobile exchange; and said mobile exchange comprises packet data processing means and means for transferring transmission frames which are in accordance with said signalling protocol and contain said packet data transmission identifier between said packet data processing means and another network element.

12. The network element according to claim 11, wherein:

said packet data processing means comprise a router interconnecting the mobile communication system to a data network.

13. The network element according to claim 12, further comprising:

means connecting said packet data processing means to said mobile exchange by a dedicated connection or a SS7 signalling network.

14. The method according to claim 1, wherein said fixed network elements comprise a mobile exchange, a base station controller and base stations.

15. The fixed network element according to claim 6, wherein the fixed network element comprises one of a mobile exchange, a base station controller and a base station.

* * * * *